Oct. 24, 1944. K. R. ELDREDGE 2,360,857
CATHODE RAY TUBE CONTROL CIRCUIT
Filed May 4, 1943
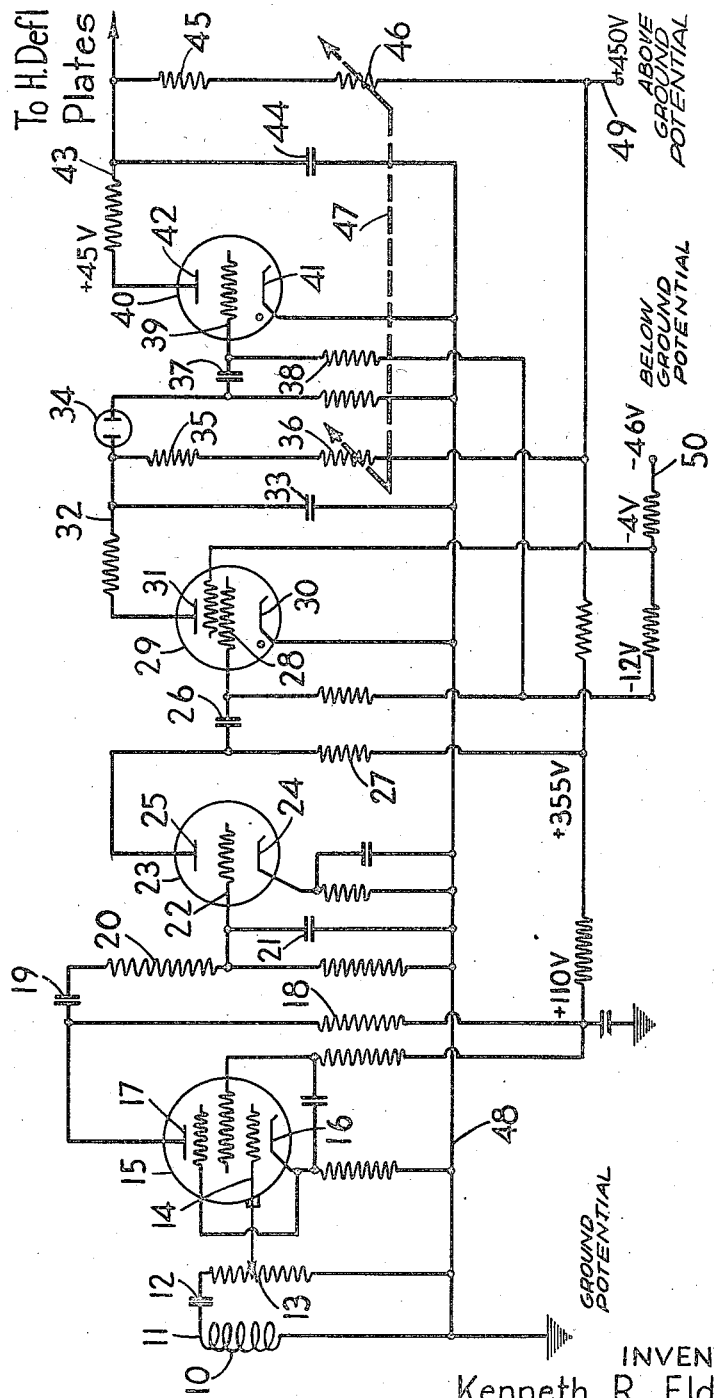
INVENTOR
Kenneth R. Eldredge
By
Attorney Patented Oct. 24, 1944

2,360,857

UNITED STATES PATENT OFFICE 2,360,857

CATHODE RAY TUBE CONTROL CIRCUIT

Kenneth R. Eldredge, Berkeley, Calif., assignor to Standard Oil Company of California, San Francisco, Calif., a corporation of Delaware Application May 4, 1943, Serial No. 485,625

4 Claims. (Cl. 171—95)

This invention relates to a method and means for synchronizing the potential applied to the time-base or horizontal trace deflecting plates of a cathode ray tube to be used for visually indicating a repetitive function, such as the detonation pressure gradient in an internal combustion engine cylinder so that the position of the vertical wave on the horizontal time-base may be controlled to be in the center of the screen and also may be adjusted as to its width along the horizontal axis.

This invention is particularly adapted to utilize the alternating voltage output of the detonation indicator which is the subject of my Patent No. 2,269,760, issued January 13, 1942. That device utilizes a magnetostrictive element which is stressed by pressure variations in an engine cylinder and correspondingly modifies the magnetic flux passing through a coil to produce an alternating current voltage which faithfully represents the instantaneous pressure gradient existing in the engine cylinder.

If the normal arrangement of a horizontal time-base or sweep circuit for the horizontal deflecting plates of a cathode ray oscillograph is used with such a device, an internal combustion engine pressure gradient diagram which will result will be separated into two parts, the positive peak and negative reversal being at the left and the initially upwardly sloping portion of the trace being at the right side of the oscillograph screen. Such a diagram is formed when the sweep circuit is timed or initiated by the impulse or pressure gradient diagram to be shown, due to the unavoidable delay in response in such a circuit, which requires an appreciable initial voltage to actuate the conventional gas triode having a condenser in its plate circuit, the output of the condenser being impressed upon the horizontal or time plates of the oscillograph.

It is desirable that the pressure gradient diagram from a detonation indicator of this kind be placed in the center of the oscillograph screen and synchronized electrically rather than mechanically with the engine being tested so that the diagram may be observed in its entirety and at a given point on the screen. If this is not done it is frequently necessary to adjust the frequency control and it is almost impossible to obtain photographs of a succession of diagrams for record purposes, particularly in the case of multicylinder engines.

This invention comprehends broadly an improvement in a conventional cathode ray oscillograph sweep circuit, such as the model 160-B R. C. A. unit, by introducing a controllable delay means in the response of the sweep circuit, this delay being about one-half of the time between successive detonation pressure gradient responses. In other words, the frequency of the sweep circuit impulses may be controlled by the detonation signals, the time delay being adjusted to be one-half cycle late so that the signal actuates the circuit for the succeeding detonation impulse or signal.

It is an object of this invention to provide an improved apparatus for controlling the sweep circuit of an oscillograph from the source of voltage impulses which are to be shown, each impulse acting upon a delay circuit to time the sweep circuit one-half cycle late so that the succeeding impulse may be placed at the desired position on the oscillograph screen.

Another object is to provide a synchronizing means for a detonation pick-up indicator which is independent of any timing source other than the detonation responses themselves, and includes means for adjusting the width or spread of the diagram on the oscillograph screen as well as its position relative to the center of the screen.

These and other objects and advantages will be found apparent from the following description and from the attached drawing which illustrates one embodiment of this invention.

The drawing is a wiring diagram of the connection between a detonation indicator of the type which delivers an alternating current voltage corresponding to pressure gradient conditions within an engine cylinder and a means embodying this invention for controlling the position of the diagram and also its width along the horizontal time-base.

Referring to the drawing, the alternating current signal from the detonation pick-up unit, generally designated 10, is passed through lead 11 and coupling condenser 12 to an attenuator 13 from which it is impressed upon the grid 14 of a conventional pentode amplifier 15 having a cathode 16 and plate 17. The output from pentode 15 is passed through a resistance coupler consisting of a resistor 18 and condenser 19 into an integrating circuit composed of a resistor 20 and condenser 21. This serves to suppress the high frequency components of the amplified alternating current output of the detonation pickup unit 10 and to pass what is substantially a pressure impulse onto the grid 22 of a triode 23. This triode has the usual cathode 24 and plate 25.

The amplified and integrated impulse is passed through a resistance coupler consisting of a condenser 26 and resistor 27 to the grid 28 of a normally nonconducting gaseous discharge tube 29 having the usual cathode 30 and plate 31. The positive voltage from the amplified impulse causes tube 29 to become conducting to current which is supplied by condenser 33, this current flow being maintained until the charge contained in 33 is lowered to a voltage level, about 15 volts, which will result in tube 29 being extinguished or nonconducting. At the time tube 29 becomes nonconducting, condenser 33 immediately begins recharging from the power supply, generally designated 49, at a rate which is controlled by resistors 35 and 36. The rising voltage in the plate circuit, generally designated 32, of tube 29 is impressed upon a gas-filled diode which may be a neon tube 34 connected across a fixed resistor 35 and a variable resistor 36. At the time the ionizing voltage of tube 34 is reached current starts to flow through that tube and it will continue until another positive impulse from the detonation indicator 10 is impressed upon the grid 28 to tube 29, causing the latter to become conducting and discharging condenser 33 to a point where its potential is below the ionization potential of tube 34.

The current passed by tube 34 at the time of its ignition is differentiated by means of a condenser 37 and a resistor 38, causing an initial positive impulse to be impressed upon the grid 39 of a second gaseous discharge tube 40 having the usual cathode 41 and plate 42. The plate circuit, generally designated 43, of tube 40, is provided with a discharge condenser 44, current limiting resistor 45, and a variable resistor 46. The action of this tube is similar to other "sawtooth" wave generators, and is consequently capable of being controlled by the impulses received upon the grid 39 of the tube.

The delay in actuation of tube 40 is therefore controlled by variable resistor 36 in the plate circuit 32 of tube 29. Resistor 36 is mechanically linked by means generally designated by the dotted line 47 to a similar variable resistor 46 in the plate circuit 43 of tube 40. Resistor 46 acts to control the width of the trace generated by the last-named tube. It will be found that adjusting the two resistors simultaneously by the means shown will enable the operator to control the position of the indicator diagram on the screen, both as to its position along the horizontal axis and its relative width or spread, the latter normally tending to become narrower with increasing engine speeds but being held to substanitally a constant width by the linkage arrangement shown.

The foregoing explanation of circuit operation will be found to apply for that range of frequency of applied impulses from engine speeds ranging from about 1000 to 5000 R. P. M. When no impulses are being received the circuit is unstable and may either be self-oscillating or completely inactive, depending upon stray potentials which may be introduced into the circuit from external sources. However, in normal operation, the functions outlined above will be found to be easily controllable in the manner described.

The usual ground return 48 and positive and negative power sources 49 and 50 are provided, together with the necessary resistors to control the potentials applied to the various plates and cathodes of the apparatus described.

The essential features of this invention appear to reside in the provision of two normally nonconducting gaseous discharge tubes coupled by a gas-filled diode and mechanically linked or ganged resistors, one in each plate circuit, which will simultaneously control the position of the pressure gradient diagram and modify its width to keep the latter constant regardless of changes in the engine speed. Those speed changes would normally shift the relative position of the diagram on the screen since the absolute delay time remains the same for a given setting of the first resistor 36. Adjustment of the mechanically coupled resistor control 47 thereby simultaneously returns the diagram to its original position on the screen and at the same time modifies its width or spread to remain constant. Numerous changes and modifications could be made in this arrangement without departing from the invention and all such falling within the scope of the appended claims are embraced thereby.

I claim:

1. Apparatus for controlling the time-base deflection plates of a cathode ray tube used for visually indicating a repetitive function such as the detonation pressure gradient condition in an internal combustion engine cylinder, wherein said condition is impressed upon a pick-up unit which translates it to an electrical impulse, said apparatus comprising means for integrating said impulse, a first normally nonconducting gaseous discharge tube having a plate, cathode and control element, a source of energy for said plate including a resistor and a first variable resistor in series, a condenser connected between said plate and said cathode, a gas-filled diode responsive to a predetermined potential across said condenser and adapted to become conducting when said potential is reached, means for differentiating the current flow through said gas-filled diode to obtain a pulse at the beginning of said current flow, a second normally nonconducting gaseous discharge tube having a plate, cathode and control element, a source of energy for said plate including a second variable resistor of similar characteristics to said first variable resistor, means for impressing said pulse from said diode onto the control element of said second gaseous discharge tube, the output of said tube being impressed upon the time-base plates of a cathode ray tube, and a mechanical linkage between said variable resistors for controlling the delay and the spread of the pressure response indication on said cathode ray tube.

2. A time delay circuit for controlling the response of the time-base deflection plates of a cathode ray tube to a succession of repetitive functions in the nature of electrical impulses, comprising two normally nonconducting gaseous discharge tubes having plates, cathodes and control elements, a condenser in the plate circuit of the first tube, a gaseous diode adapted to be energized from said condenser to become conducting when the potential of said condenser reaches a predetermined value, means for differentiating the current flow through said diode and for impressing the positive impulse produced thereby on the control element of said second gaseous discharge tube, a condenser in the plate circuit of said second tube, and identical mechanically coupled resistors in the plate circuits of both said gaseous discharge tubes to control the time delay and the frequency, respectively, of the condenser output impulses of said second tube.

3. A time delay circuit for controlling the response of the time-base deflection plates of a cathode ray tube to a succession of repetitive functions in the nature of alternating current impulses comprising a first and second normally nonconducting gaseous electron discharge tubes having plates, cathodes and control elements, separate electrical charge accumulators for the plate circuit of each of said tubes, a voltage responsive gas-filled tube and an electrical differentiating means serially connecting said first charge accumulator to the control element of said second tube, and mechanically coupled resistors in the plate circuits of said first and second tubes to control the time delay and frequency, respectively, of the output impulses of the charge accumulator of said second tube.

4. A time delay circuit according to claim 3 in which said voltage responsive gas-filled tube is a neon filled diode and said charge accumulators are condensers.

KENNETH R. ELDREDGE.